United States Patent
Peng

(10) Patent No.: US 11,294,517 B2
(45) Date of Patent: Apr. 5, 2022

(54) CAPACITIVE SINGLE LAYER MULTI-TOUCH PANEL HAVING IMPROVED RESPONSE CHARACTERISTICS

(71) Applicant: Texas Instruments Incorporated, Dallas, TX (US)

(72) Inventor: Tao Peng, Carlsbad, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 90 days.

(21) Appl. No.: 16/902,494

(22) Filed: Jun. 16, 2020

(65) Prior Publication Data
US 2020/0310570 A1    Oct. 1, 2020

Related U.S. Application Data

(63) Continuation of application No. 16/017,108, filed on Jun. 25, 2018, now Pat. No. 10,719,181, which is a continuation of application No. 13/872,448, filed on Apr. 29, 2013, now abandoned, which is a continuation of application No. PCT/CN2013/071011, filed on Jan. 28, 2013.

(51) Int. Cl.
*G06F 3/044* (2006.01)
*G06F 3/041* (2006.01)

(52) U.S. Cl.
CPC .......... *G06F 3/0443* (2019.05); *G06F 3/0446* (2019.05); *G06F 3/04164* (2019.05)

(58) Field of Classification Search
CPC ... G06F 3/0443; G06F 3/0446; G06F 3/04164
See application file for complete search history.

(56) References Cited

U.S. PATENT DOCUMENTS

| | | | |
|---|---|---|---|
| 4,237,421 A | 12/1980 | Waldron | |
| 6,188,391 B1 | 2/2001 | Seely et al. | |
| 7,714,847 B2 | 5/2010 | Hsu et al. | |
| 8,278,571 B2 | 10/2012 | Orsley | |
| 2006/0097991 A1 | 5/2006 | Hotelling et al. | |
| 2009/0091551 A1 | 4/2009 | Hotelling et al. | |
| 2010/0110041 A1 | 5/2010 | Jang | |
| 2010/0149108 A1 | 6/2010 | Hotelling et al. | |
| 2010/0156810 A1 | 6/2010 | Barbier et al. | |
| 2010/0245285 A1 | 9/2010 | Wang et al. | |

(Continued)

FOREIGN PATENT DOCUMENTS

| | | |
|---|---|---|
| CN | 201218943 Y | 4/2009 |
| KR | 1020060086623 A | 8/2006 |

(Continued)

*Primary Examiner* — Kent W Chang
*Assistant Examiner* — Chayce R Bibbee
(74) *Attorney, Agent, or Firm* — Michelle F. Murray; Charles A. Brill; Frank D. Cimino

(57) ABSTRACT

An apparatus is provided. A substrate and a cover plate are provided. A sensor layer is formed on at least one of the substrate and the cover plate. The sensor layer includes a plurality of row electrodes and a plurality of column electrodes interleaved with the plurality of row electrodes, where each row electrode and each column electrode is formed of a plurality of stair-stepped diamonds. An insulator is also included so as to electrically isolate the plurality of row electrodes and the plurality of column electrodes, where the insulator is substantially transparent to visible spectrum light. The apparatus employs mirror symmetric row sensor routing placement.

20 Claims, 6 Drawing Sheets

(56) References Cited

U.S. PATENT DOCUMENTS

| | | |
|---|---|---|
| 2010/0321326 A1 | 12/2010 | Hotelling et al. |
| 2011/0095996 A1 | 4/2011 | Yimaz |
| 2011/0095997 A1 | 4/2011 | Philipp |
| 2011/0102361 A1 | 5/2011 | Phillipp |
| 2011/0157079 A1 | 6/2011 | Wu et al. |
| 2012/0056664 A1 | 3/2012 | Nam |
| 2012/0075214 A1 | 3/2012 | Kim |
| 2013/0100041 A1 | 4/2013 | Golovchenko et al. |

FOREIGN PATENT DOCUMENTS

| | | |
|---|---|---|
| WO | 2009046363 A1 | 4/2009 |
| WO | 2011018594 A2 | 2/2011 |

CAPACITIVE SINGLE LAYER MULTI-TOUCH PANEL HAVING IMPROVED RESPONSE CHARACTERISTICS

This application is a continuation of U.S. Non-Provisional application Ser. No. 16/017,108 filed Jun. 25, 2018, which is a continuation U.S. Non-Provisional application Ser. No. 13/872,448, filed Apr. 29, 2013, which is a continuation of PCT/CN2013/071011, filed Jan. 28, 2013, which applications are hereby incorporated by reference herein in their entireties.

TECHNICAL FIELD

The invention relates generally to a touch panel and, more particularly, to a capacitive touch panel having an improved response.

BACKGROUND

Turning to FIGS. 1 and 2, an example of a conventional system 100 can be seen. System 100 generally comprises a touch panel 102 and touch panel controller 104. The touch panel 102 has an array of sensors formed by a set of column electrodes (e.g., electrode 103), where each electrode of each column is coupled together by a strip electrode (e.g., strip electrode 107), and a set of row electrodes (e.g., electrode 105), where each electrode of each row is coupled together by a strip electrode (e.g., strip electrode 109). Usually, the column and row electrodes (e.g., electrodes 103 and 105) are formed in two separate layers with a dielectric or insulating layer formed therebetween, and these conductive layers which form the electrodes (e.g., electrodes 105 and 109) are generally transparent to visible spectrum light (e.g., light having a wavelength from about 380 nm to about 750 nm). The strip electrodes for each column (e.g., strip electrode 107) are then coupled to the interface or I/F 106 of the touch panel controller 104 by terminals X-1 to X-N, while the strip electrodes for each row (e.g., strip electrode 109) are coupled to the interface 106 by terminals Y-1 to Y-M. The interface 106 is able to communicate with the control circuit 108. As shown in greater detail in FIG. 2, the interface 106 is generally comprised of a multiplexer or mux 202 and an exciter 204.

In operation, the interface 106 (which is usually controlled by the control circuit 108) selects and excites columns of electrodes (e.g., electrode 103) and "scans through" the rows of row electrodes (e.g., electrode 105) so that a touch position from a touch event can be resolved. As an example, interface 204 can excite two adjacent columns through terminals X-j and X-(j+1) with excitation signals EXCITE[j] and EXCITE[j+1], and interface 106 receives a measurement signal from a row associated with terminal Y-i. When an object (e.g., finger) is in proximity to the touch panel (which is generally considered to be a touch event), there is a change in capacitance due at least in part to the arrangement of electrodes (e.g., electrodes 103 and 105), and the controller 108 is able to resolve the position of the touch event.

Most conventional touch panels (e.g., touch panel 102) do, however, exhibit a non-uniform response characteristic, which is manifested as non-uniform signal strength across the panel. This non-uniformity is generally caused by natural variations in the patterns forming the column and row electrodes (e.g., electrodes 103 and 105). In other words, the electrodes are arranged to have gaps or non-overlapping regions between the electrodes so that, as an object (e.g., finger) traverses the panel (e.g., panel 102) and passes over these non-overlapping regions, the signal strength or measured capacitance changes. Therefore, there is a need for a touch panel having a more uniform response characteristic.

Some examples of other conventional systems are: U.S. Pat. Nos. 4,237,421; 6,188,391; 7,714,847; U.S.; U.S. Pat. No. 8,278,571; Patent Pre-Grant Publ. No. 2006/0097991; U.S. Patent Pre-Grant Publ. No. 2009/0091551; U.S. Patent Pre-Grant Publ. No. 2010/0149108; U.S. Patent Pre-Grant Publ. No. 2010/0156810; U.S. Patent Pre-Grant Publ. No. 2010/0321326; U.S. Patent Pre-Grant Publ. No. 2011/0095996; U.S. Patent Pre-Grant Publ. No. 2011/0095997; U.S. Patent Pre-Grant Publ. No. 2011/0102361; U.S. Patent Pre-Grant Publ. No. 2011/0157079; U.S. Patent Pre-Grant Publ. No. 2012/0056664; PCT Publ. No. WO2009046363; and PCT Publ. No. WO2011018594.

SUMMARY

An embodiment of the present invention, accordingly, provides an apparatus comprising: a substrate; a cover plate that is substantially transparent to visible spectrum light; a sensor layer formed on at least one of the substrates and the cover plate, wherein the sensor layer includes: a plurality of row electrodes; a plurality of column electrodes interleaved with the plurality of row electrodes, wherein the intersections of each row electrode and each column electrode are arrayed in a logical array defined to reduce parasitic capacitance and resistance; traces formed in the single layer electrically connected to each of the row and column electrodes; and a board configured for attaching to the substrate, the board including vias and routing that provide an equivalent of electrical crossovers to electrically connect each of the electrodes in a row to one another while providing electrical isolation from row electrodes and traces associate with other rows.

In accordance with the present invention, the conductive layer is formed on the cover plate.

In accordance with the present invention, the conductive layer is formed on the substrate.

In accordance with the present invention, the first and second columns of electrodes are horizontal mirror images of one another, the third and forth columns of electrodes are horizontal mirror images of one another and continuing on with columns n−1 and n being horizontal images of one another to complete the column layout in the array.

In accordance with the present invention, the intersections of each row electrode of the row of electrodes with the first and second columns of electrodes is a vertical mirror image of the row of electrodes that intersect with third and fourth columns of electrodes and continuing on with alternating rows with alternating mirrored pairs of columns of electrodes.

In accordance with the present invention, each of the interleaved pairs of columns and rows is formed of a single conductive trace.

In accordance with the present invention, the single conductive trace is substantially transparent to visible spectrum light.

In accordance with the present invention, an insulator that electrically isolates the plurality of row electrodes and the plurality of column electrodes is substantially transparent to visible spectrum light.

An embodiment of the present invention, accordingly, provides an apparatus comprising: a touch panel having: a substrate; a cover plate that is substantially transparent to visible spectrum light; a sensor layer formed on at least one of the substrates and the cover plate, wherein the sensor layer includes: a plurality of row electrodes; a plurality of column electrodes interleaved with the plurality of row electrodes, wherein the intersections of each row electrode and each column electrode are arrayed in a logical array defined to reduce parasitic capacitance and resistance; and an insulator that electrically isolates the plurality of row electrodes and the plurality of column electrodes, wherein the insulator is substantially transparent to visible spectrum light; traces formed in the single layer electrically connected to each of the row and column electrodes; a board configured for attaching to the substrate, the board including vias and routing that provide an equivalent of electrical crossovers to electrically connect each of the electrodes in a row to one another while providing electrical isolation from row electrodes and traces associate with other rows; an interconnect that is coupled to each row electrode and each column electrode; and a touch panel controller that is coupled to the interconnect.

In accordance with the present invention, the conductive layer is formed on the cover plate.

In accordance with the present invention, the conductive layer is formed on the substrate.

In accordance with the present invention, the first and second columns of electrodes are horizontal mirror images of one another, the third and forth columns of electrodes are horizontal mirror images of one another and continuing on with columns n−1 and n being horizontal images of one another to complete the column layout in the array.

In accordance with the present invention, the intersections of each row electrode of the row of electrodes with the first and second columns of electrodes is a vertical mirror image of the row of electrodes that intersect with third and fourth columns of electrodes and continuing on with alternating rows with alternating mirrored pairs of columns of electrodes.

In accordance with the present invention, each of the interleaved pairs of columns and rows is formed of a single conductive trace.

In accordance with the present invention, the single conductive trace is substantially transparent to visible spectrum light.

In accordance with the present invention, an insulator that electrically isolates the plurality of row electrodes and the plurality of column electrodes is substantially transparent to visible spectrum light.

In accordance with the present invention, the touch panel is coupled to the board.

An embodiment of the present invention, accordingly, provides an apparatus comprising: a touch panel having: a display; a substrate that is secured to the display, wherein the substrate is substantially transparent to visible spectrum light; a sensor layer formed over the substrate, wherein the sensor layer includes: a plurality of row electrodes formed over the substrate; a plurality of column electrodes formed over the substrate, wherein each column electrode is interleaved with the plurality of row electrodes, wherein the intersections of each row electrode and each column electrode are arrayed in a logical array defined to reduce parasitic capacitance and resistance; and a first insulator that is formed over the substrate and the sensor layer, wherein the first insulator is substantially transparent to visible spectrum light, and wherein the first insulator electrically isolates the plurality of row electrodes and the plurality of column electrodes; a cover plate that is secured to the first insulator layer, wherein the cover plate is substantially transparent to visible spectrum light; an interconnect that is coupled to each column electrode and each row electrode; and a touch panel controller having: an interface that is coupled to the interconnect; and a control circuit that is coupled to the interface.

In accordance with the present invention, each the plurality of row electrodes and column electrodes is formed of a conductive trace.

In accordance with the present invention, the plurality of row electrodes, the plurality of column electrodes, and the plurality of bridge conductors are formed of indium tin oxide (ITO).

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
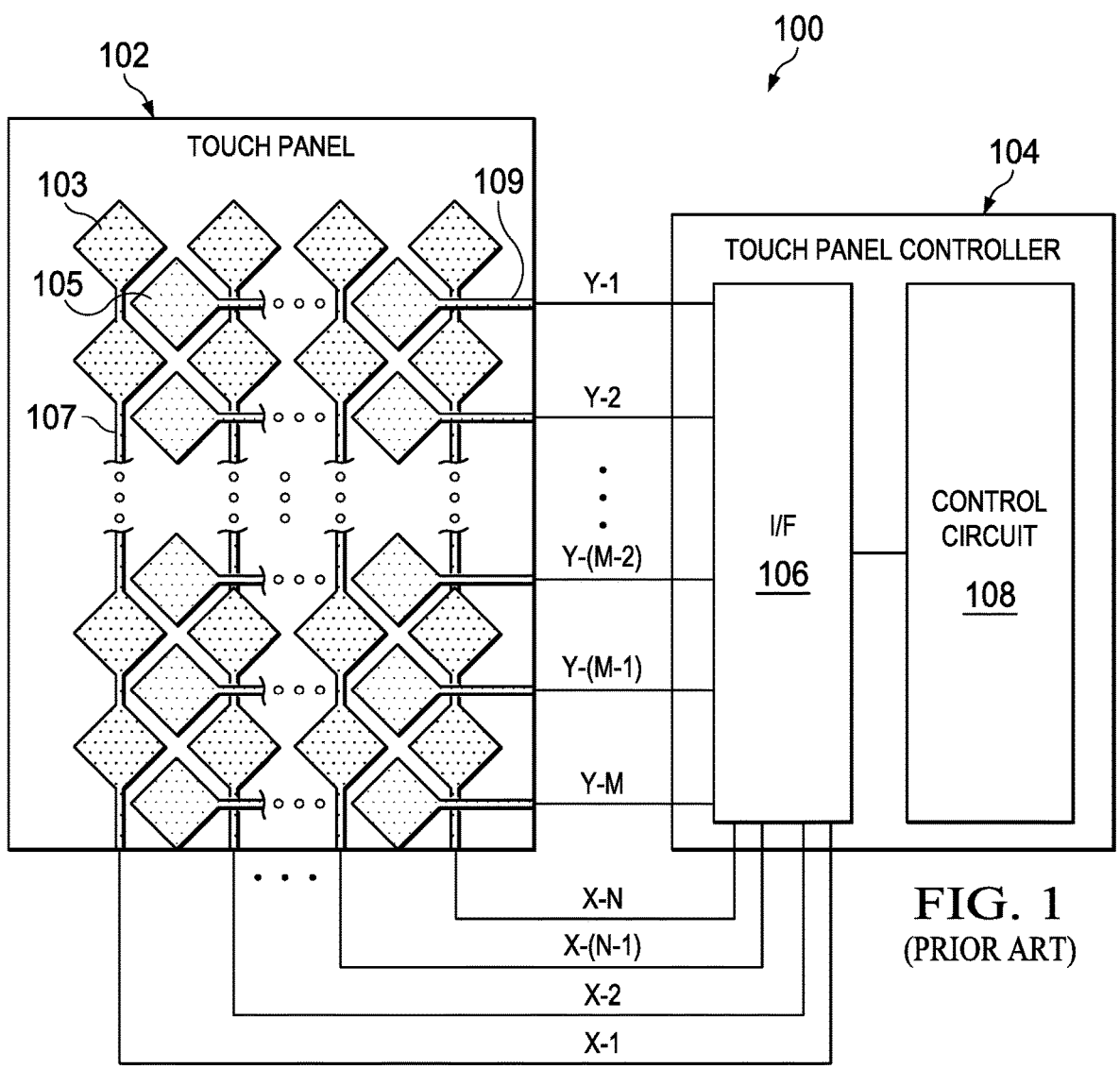
FIGS. 1 and 2 are diagrams of an example of a conventional system.
Figure 2:
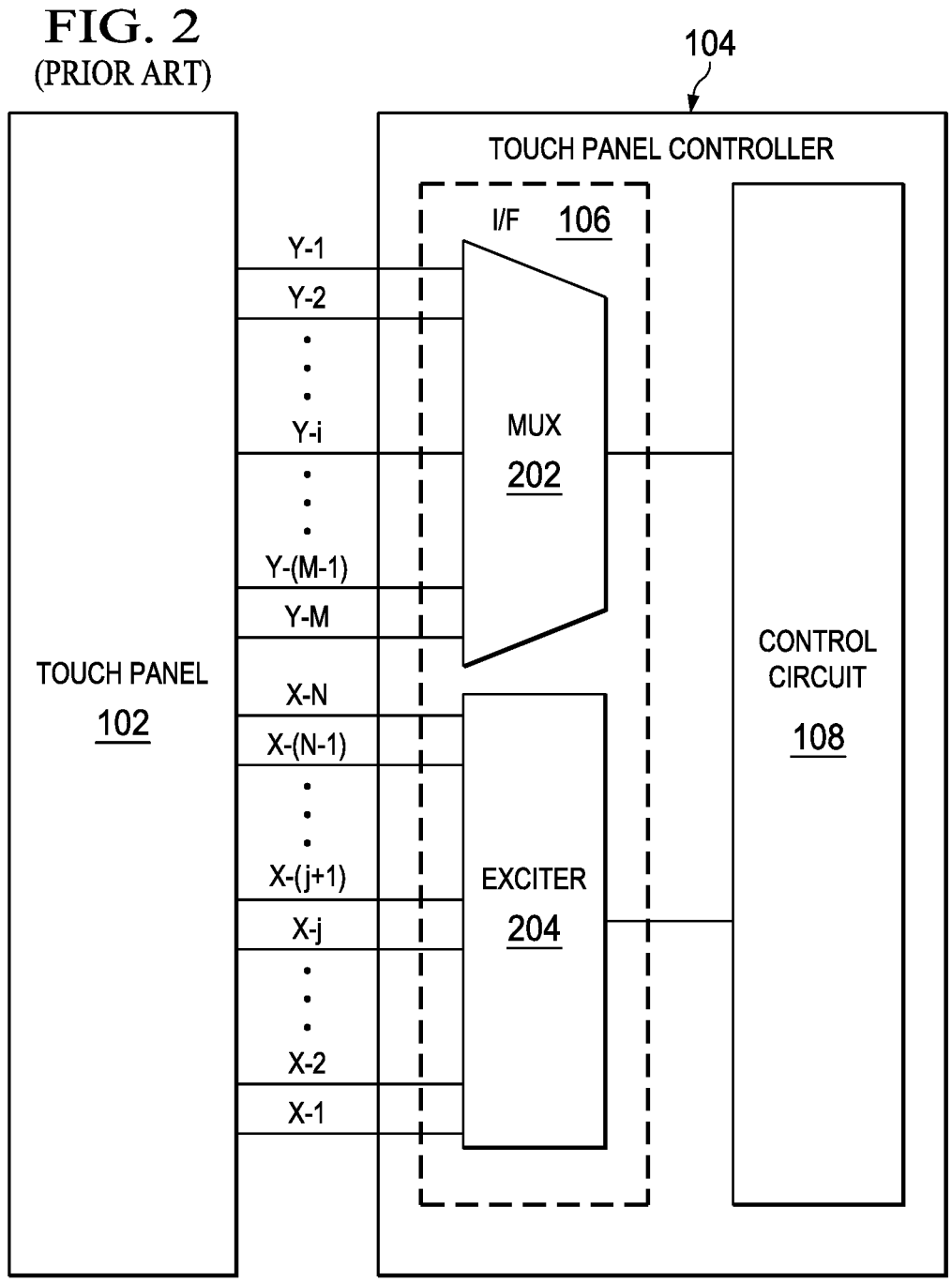

Refer now to the drawings wherein depicted elements are, for the sake of clarity, not necessarily shown to scale and wherein like or similar elements are designated by the same reference numeral through the several views.

Figure 3:
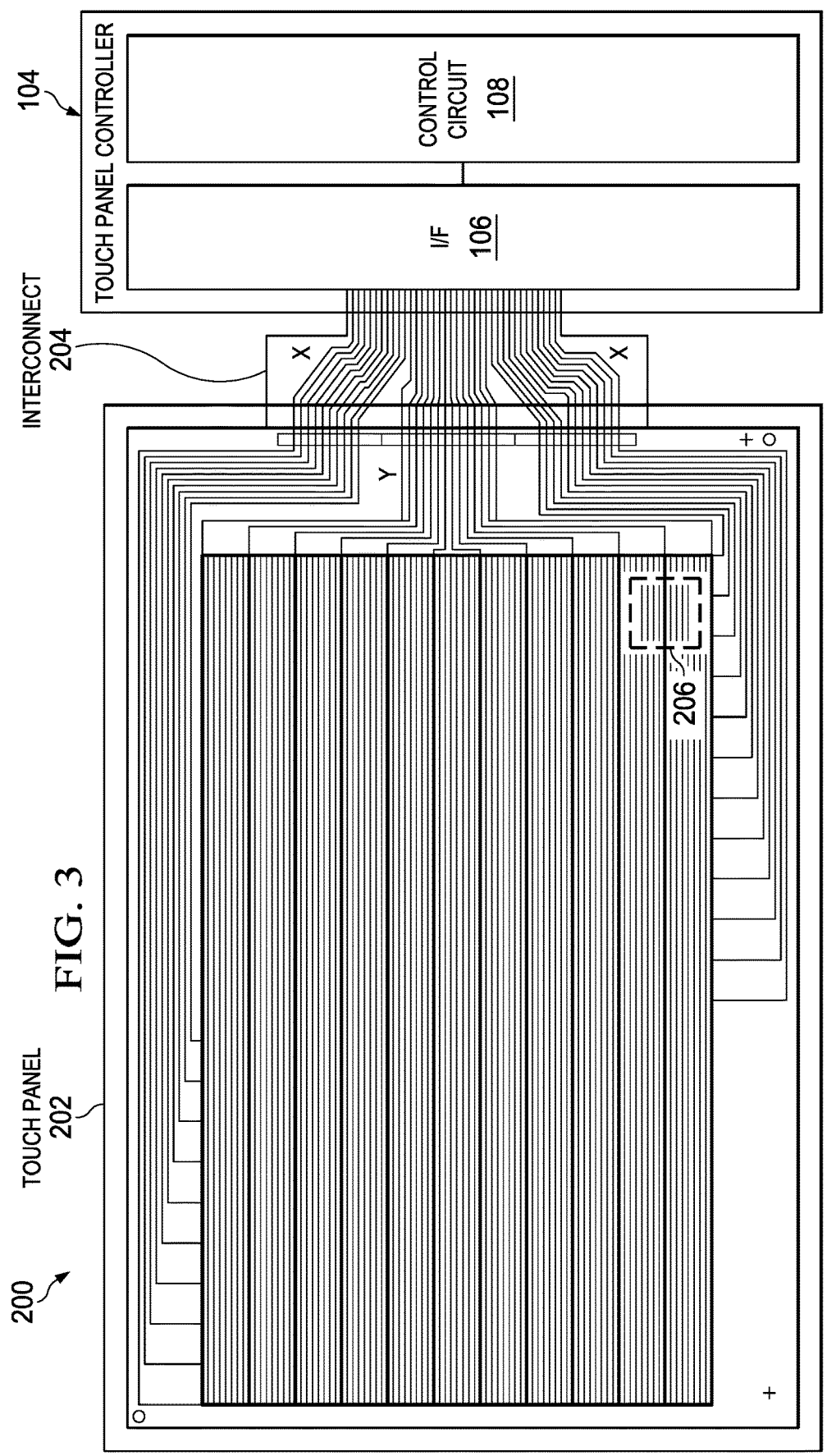
FIG. 3 is diagrams of an example of a system in accordance with the present invention.

Turning to FIG. 3, an example of a system 200 in accordance with the present invention can be seen. System 200 is similar in construction to system 100 except that touch panel 102 has been replaced by touch panel 202. Additionally, interconnect 204 has been provided to provide communication channels between the touch panel controller 104 and the touch panel 202.

Figure 4:
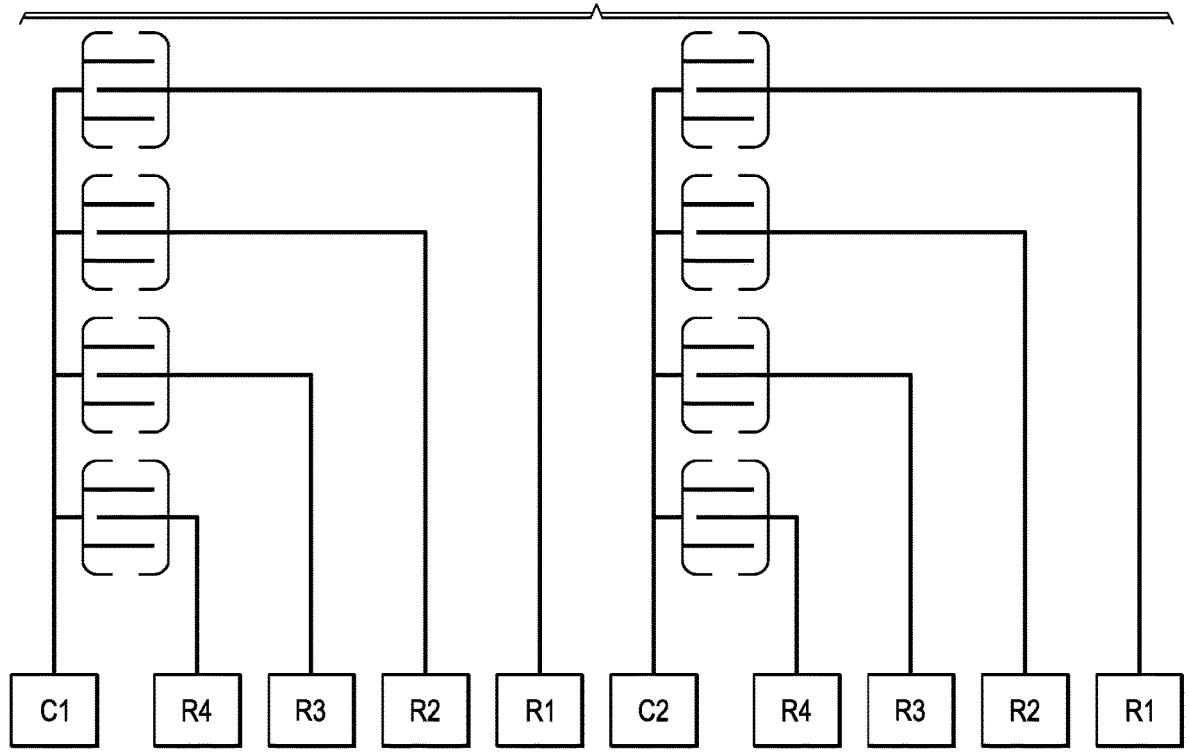
FIG. 4 is an example of a conventional single layer portion of a touch panel of FIG. 3.

In FIG. 4, a 4 row by 2 column portion of conventional single layer touch panel can be seen. As shown in this example, the touch panel is generally comprised of a touch sensor disposed over or positioned over a display (which can, for example be a liquid crystal display or LCD) so as to allow the light from the display to project through the sensor. This means that each trace of the layer sensor is substantially transparent to visible spectrum light. As shown, the touch sensor is a single layer sensor, having rows R1, R2, R3 and R4 and columns C1 and C2. The column and row traces, in this example, each have a conductive layer disposed on a substrate. Typically, the substrate is formed of glass (which is substantially transparent to visible spectrum light), and the conductive layer is usually formed of a conductive material that is generally transparent to visible spectrum light (such as indium tin oxide, aluminum doped zinc oxide, gallium doped zinc oxide, or indium doped zinc oxide). The conductive layer is usually formed by electron beam evaporation, physical vapor deposition (PVD), or sputter deposition on the substrate, which can, for example, then be patterned using laser ablation or etching so to form the detection electrodes. The sensor layers can then be secured to the cover plate, using an insulating or dielectric material (which can be an adhesive, like epoxy).

Figure 5:
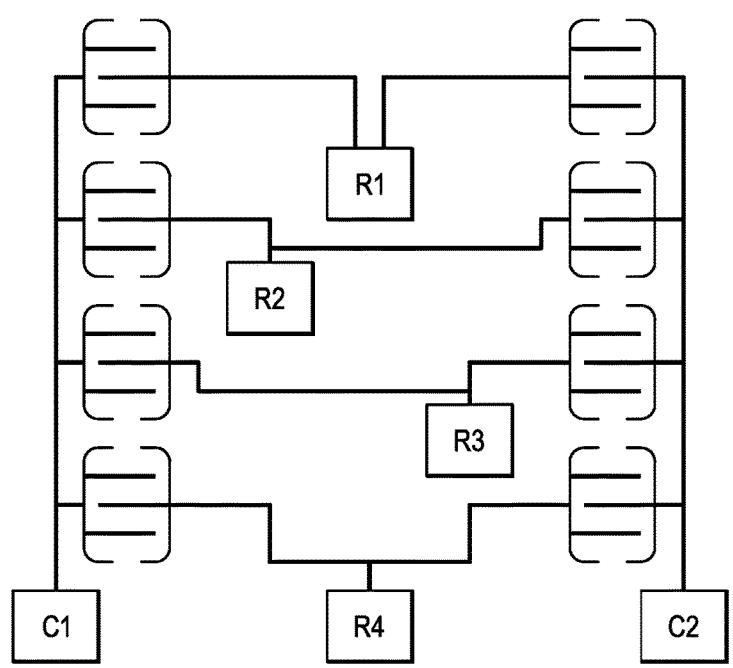
FIG. 5 is an example of layout of optimized to reduce the number of row bonding pads.
Figure 6:
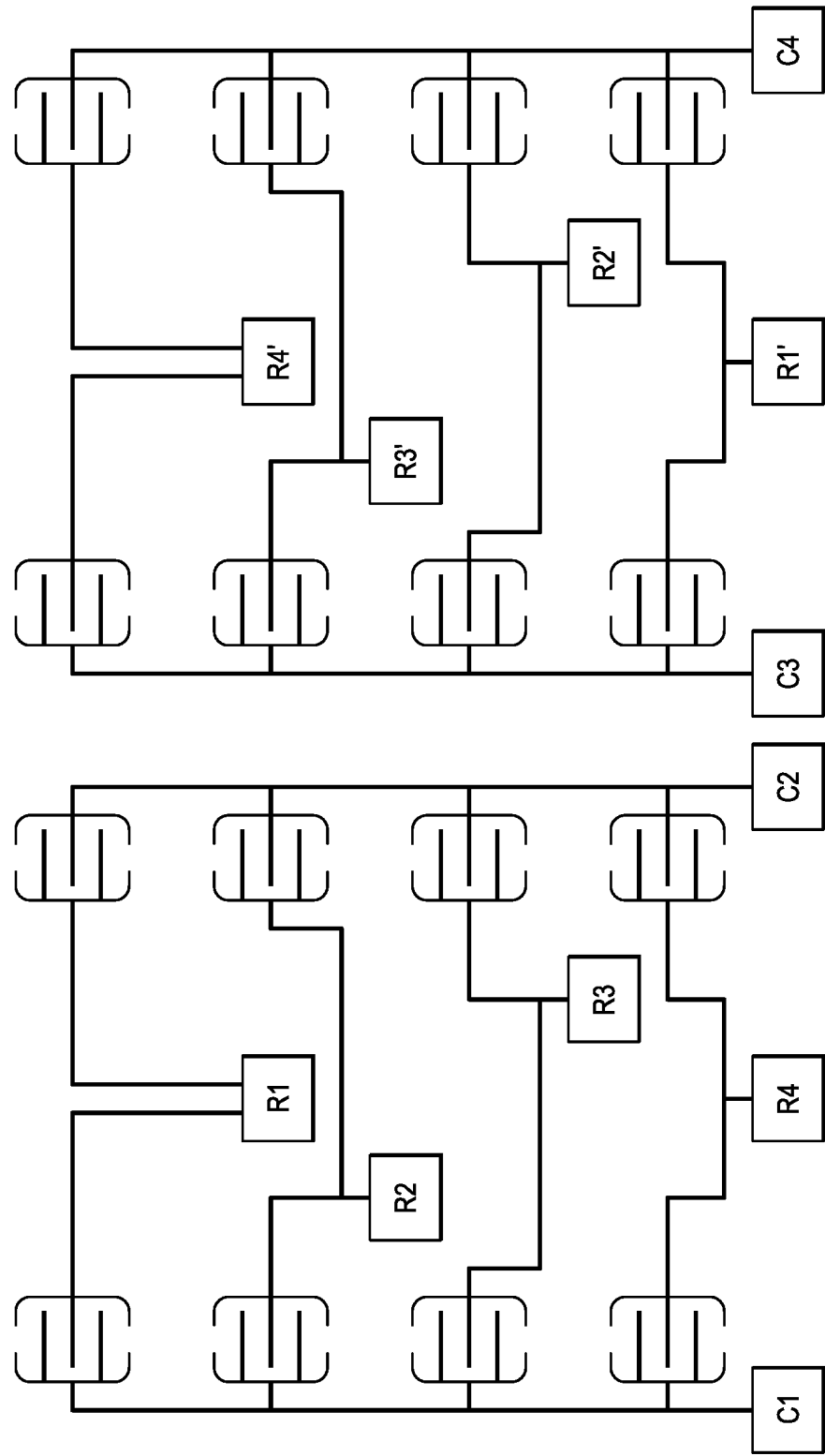
FIG. 6 is a physical layout of a portion of a touch panel in accordance with the present invention.

In order to achieve a more uniform response characteristic for the touch sensor, the patterns for the conductors should be modified. As shown in the example of FIGS. 5 and 6, row and column traces are interleaved across the touch sensor. The interleaving can vary in configuration based on the logical arrangement of the conductors but are intended to reduce the size, parasitic resistance and capacitance (and, thus, the impact) of the array and produce a generally uniform response characteristic across the touch sensor.

Figure 7:
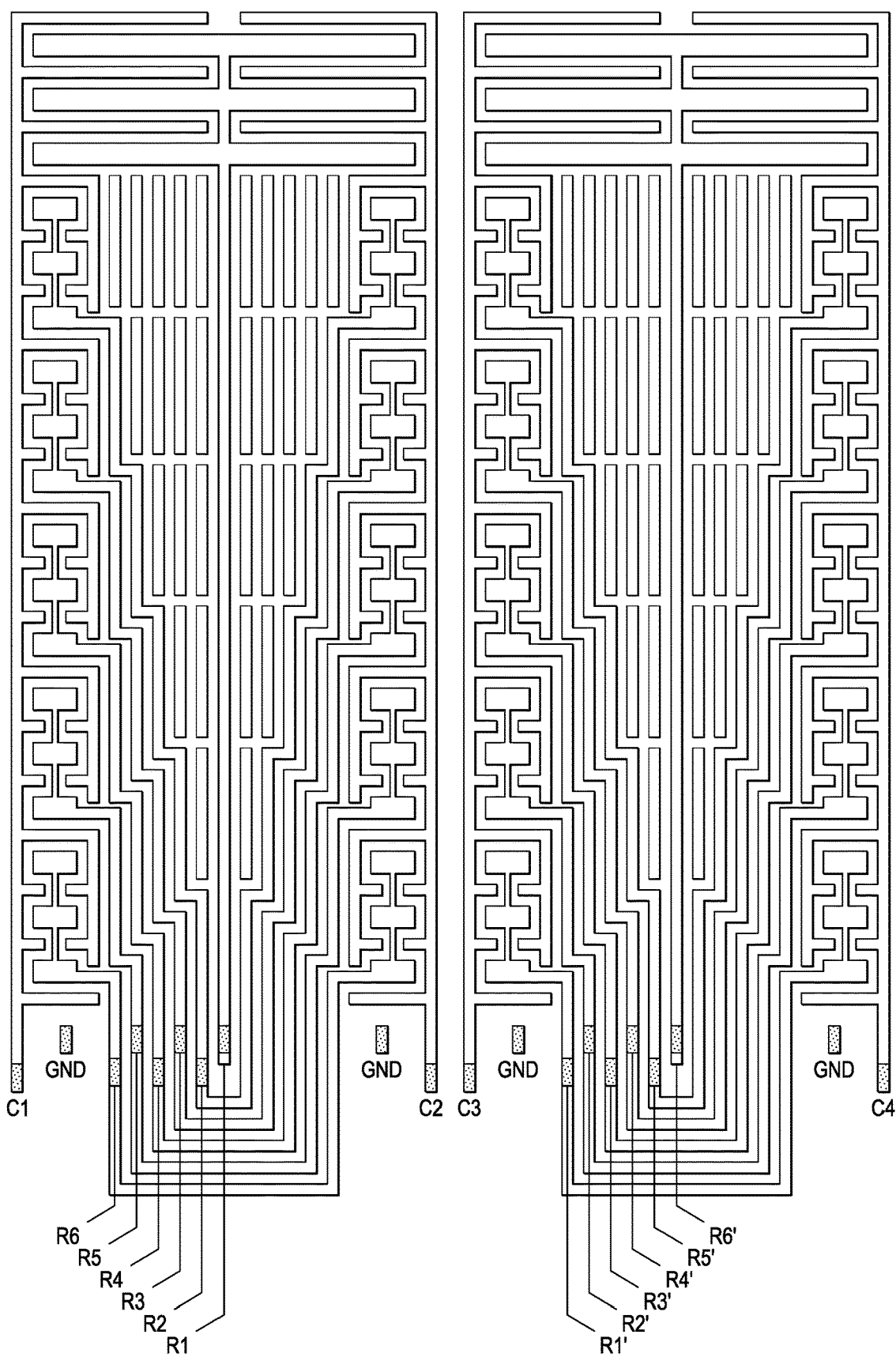
FIG. 7 depicts an example an actual layout of a 6 row by 4 column touchpad.

In FIGS. 6 and 7, examples of configurations for the row and column logical arrangements are shown. In FIG. 6, the far and end rows have been shuffled to reduce RC loading. The shuffling is de-shuffled in digital processing in the control circuit 108 of the touch panel controller 104. In this example, electrode of row R1 associated with column C1 and column C2 has the longest routing trace which can be 30 kilohms or higher. Parasitic fringing capacitance of row R1 resulted from coupling with its neighbor hood rows are also the largest of all. However, both R and C come down to minimum for logical row R1' associated with column C3 and column C4. Following the same arrangement row R2 in column C1 and column C2 is shuffled from the high RC scenario down to low RC scenario in column C3 and column C4. By placing the columns in a mirror symmetric manner as shown in FIG. 6, the bonding pads on the rows are reduced by 50%. FIG. 7 shows and exemplary layout of a 6 row by 4 column touch pad as disclosed in this invention.

As a result of using the configurations shown in FIGS. 6 and 7, several advantages can be realized. One advantage is that the touch panel has a more uniform response characteristic because of the reduction in parasitic capacitance and resistance (the worst case RC is reduced by 50%). Also, because the touch panel in the present invention is a true single metal configuration, where bonding failure is a major manufacturing bottleneck, yield due to reduced bonding pad count is enhanced and thus processing cost is reduced.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

What is claimed is:

1. An apparatus comprising:
   a sensor layer comprising:
      row electrodes comprising a first row electrode, a second row electrode, a third row electrode, and a fourth row electrode;
      column electrodes comprising a first column electrode, a second column electrode, a third column electrode, and a fourth column electrode, the first column electrode interleaved with the first row electrode, the second column electrode interleaved with the second row electrode, the third column electrode interleaved with the third row electrode, and the fourth column electrode interleaved with the fourth row electrode; and
      traces comprising:
         a first trace coupled to the first row electrode and to the second row electrode;
         a second trace coupled to the third row electrode and to the fourth row electrode;
         a third trace coupled to the first column electrode and to the third column electrode; and
         a fourth trace coupled to the second column electrode and to the fourth column electrode.

2. The apparatus of claim 1, wherein the first row electrode and the second row electrode are in a first row, the third row electrode and the fourth row electrode are in a second row, the first column electrode and the third column electrode are in a first column, and the second column electrode and the fourth column electrode are in a second column.

3. The apparatus of claim 1, wherein the row electrodes further comprise a fifth row electrode, a sixth row electrode, a seventh row electrode, and an eighth row electrode, the column electrodes further comprise a fifth column electrode, a sixth column electrode, a seventh column electrode, and an eighth column electrode, wherein the fifth column electrode is interleaved with the fifth row electrode, the sixth column electrode is interleaved with the sixth row electrode, the seventh column electrode is interleaved with the seventh row electrode, and the eight column electrode is interleaved with the eight row electrode.

4. The apparatus of claim 3, wherein the third trace is further coupled to the fifth column electrode and to the seventh column electrode, wherein the fourth trace is further coupled to the sixth column electrode and to the eighth column electrode, the sensor layer further comprising a fifth trace and a sixth trace, wherein the fifth trace is coupled to the fifth row electrode and to the sixth row electrode, and wherein the sixth trace is coupled to the seventh row electrode and the eight row electrode.

5. The apparatus of claim 3, wherein the sensor layer further comprises:
   a fifth trace coupled to the fifth row electrode and to the sixth row electrode;
   a sixth trace coupled to the seventh row electrode and to the eight row electrode;
   a seventh trace coupled to the fifth column electrode and to the seventh column electrode; and
   an eight trace coupled to the sixth column electrode and the eighth column electrode.

6. The apparatus of claim 1, further comprising a substrate, wherein the sensor layer is disposed on the substrate.

7. The apparatus of claim 6, further comprising a conductive layer disposed on the substrate.

8. The apparatus of claim 6, further comprising an insulator disposed over the substrate and over the sensor layer.

9. The apparatus of claim 6, further comprising a display attached to the substrate.

10. The apparatus of claim 6, wherein the substrate is configured to be attached to a board, the board comprising vias and routing.

11. The apparatus of claim 1, further comprising a cover plate disposed on the sensor layer.

12. A system comprising:
   a touch panel comprising:
      a sensor layer comprising:
         row electrodes comprising a first row electrode and a second row electrode, wherein the first row electrode is in a first physical row and the second row electrode is in a second physical row, wherein the first physical row is different than the second physical row;
         column electrodes comprising a first column electrode and a second column electrode, the first column electrode interleaved with the first row electrode and the second column electrode interleaved with the second row electrode; and traces coupled to the first row electrode and to the second row electrode;

a touch panel controller comprising:

an interface; and a control circuit coupled to the interface, wherein the control circuit is configured to associate the first row electrode and the second row electrode with a logical row; and interconnect coupling the interface to the traces.

13. The system of claim 12, further comprising a substrate, wherein the sensor layer is disposed on the substrate.

14. The system of claim 13, further comprising a display attached to the substrate.

15. The system of claim 13, wherein the substrate is configured to be attached to a board, the board comprising vias and routing.

16. The system of claim 12, further comprising a cover plate disposed on the sensor layer.

17. An apparatus comprising:

a substrate;

a sensor layer disposed on the substrate, the sensor layer comprising:

row electrodes comprising a first row electrode, a second row electrode, a third row electrode, and a fourth row electrode;

column electrodes comprising a first column electrode, a second column electrode, a third column electrode, and a fourth column electrode, the first column electrode interleaved with the first row electrode, the second column electrode interleaved with the second row electrode, the third column electrode interleaved with the third row electrode, and the fourth column electrode interleaved with the fourth row electrode; and traces comprising:

a first trace coupled to the first row electrode and to the second row electrode;

a second trace coupled to the third row electrode and to the fourth row electrode;

a third trace coupled to the first column electrode and to the third column electrode; and a fourth trace coupled to the second column electrode and to the fourth column electrode;

a conductive layer disposed on the substrate; and an insulator disposed over the substrate.

18. The apparatus of claim 17, further comprising a display attached to the substrate.

19. The apparatus of claim 17, wherein the substrate is configured to be attached to a board, the board comprising vias and routing.

20. The apparatus of claim 17, further comprising a cover plate disposed on the sensor layer.

* * * * *